No. 833,042. PATENTED OCT. 9, 1906.
W. V. GILBERT.
COMPOUND SPRING LEVER.
APPLICATION FILED MAY 9, 1906.
4 SHEETS—SHEET 1.
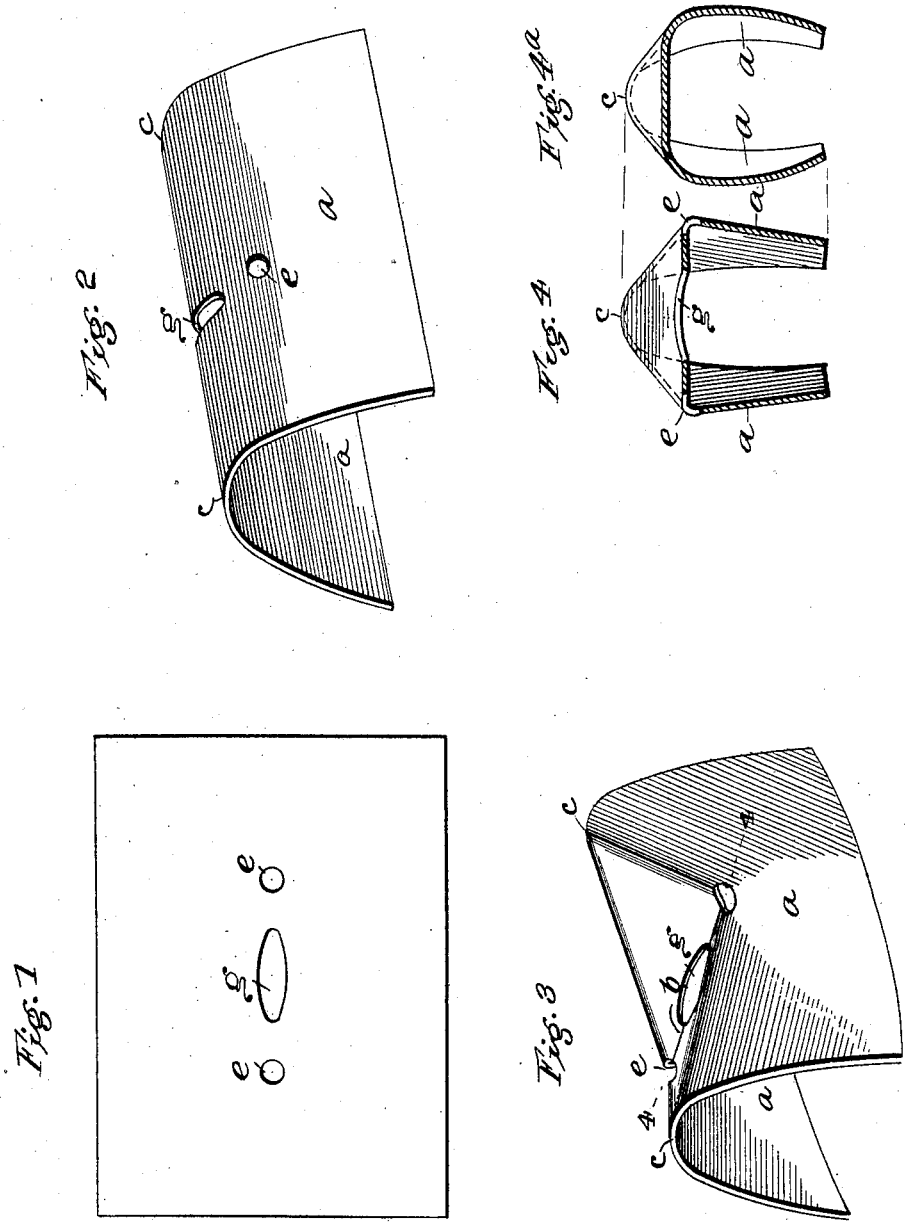
WITNESSES
INVENTOR
WALTER V. GILBERT
BY
ATTORNEYS No. 833,042. PATENTED OCT. 9, 1906.
W. V. GILBERT.
COMPOUND SPRING LEVER.
APPLICATION FILED MAY 9, 1906.

WITNESSES

INVENTOR
WALTER V. GILBERT
BY
ATTORNEYS

No. 833,042. PATENTED OCT. 9, 1906.
W. V. GILBERT.
COMPOUND SPRING LEVER.
APPLICATION FILED MAY 9, 1906.
4 SHEETS—SHEET 3.
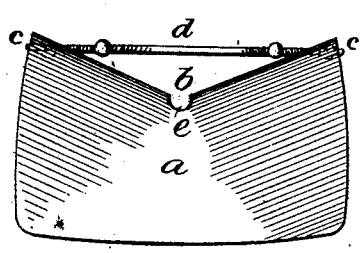
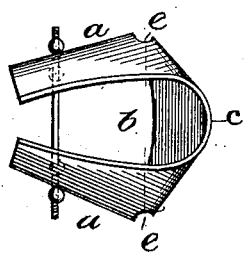
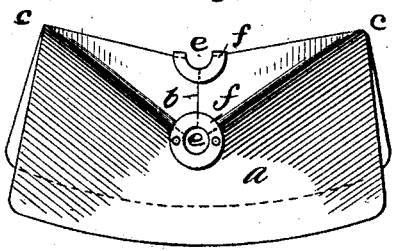
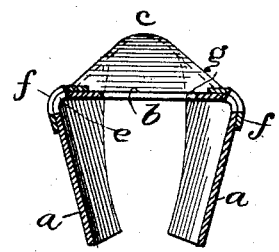
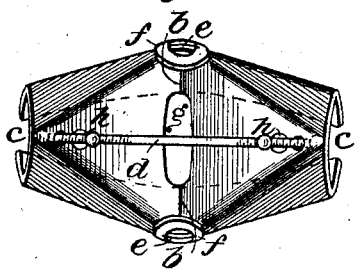
WITNESSES
INVENTOR
WALTER V. GILBERT
BY
ATTORNEYS No. 833,042. PATENTED OCT. 9, 1906.
W. V. GILBERT.
COMPOUND SPRING LEVER.
APPLICATION FILED MAY 9, 1906.
4 SHEETS—SHEET 4.
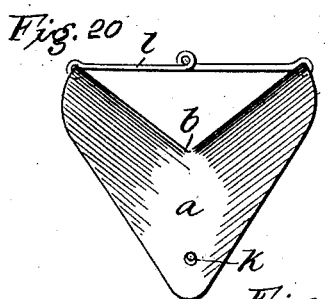
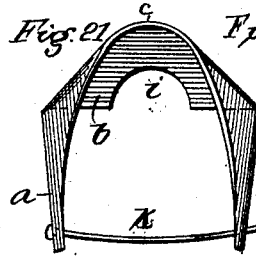
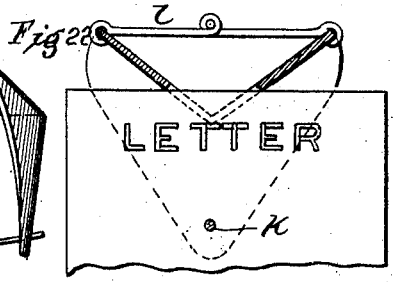
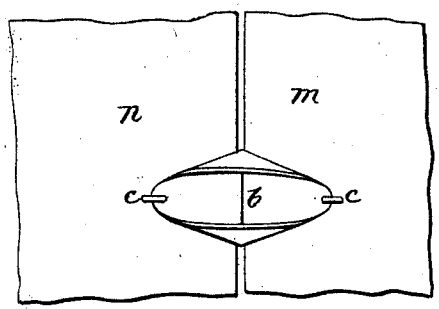
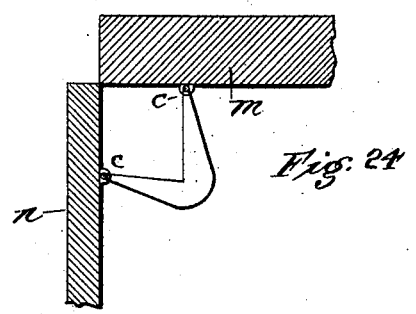
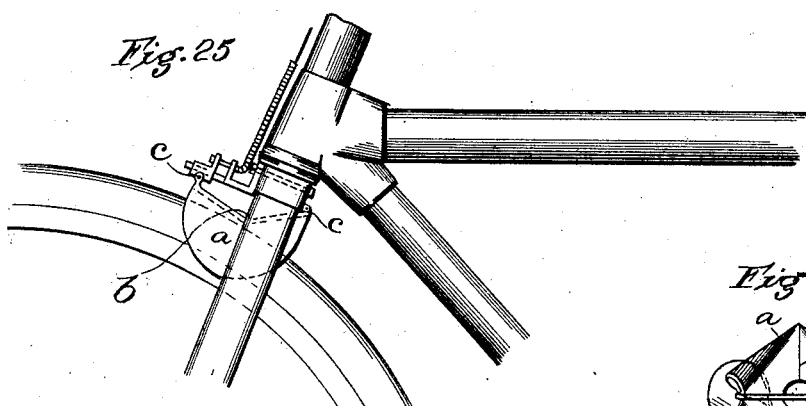
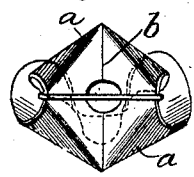
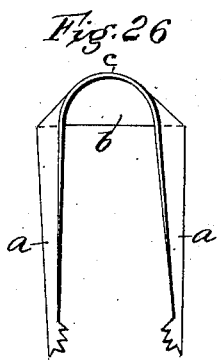
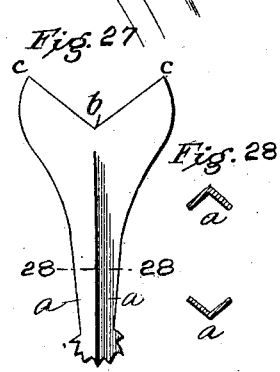
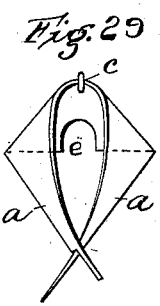
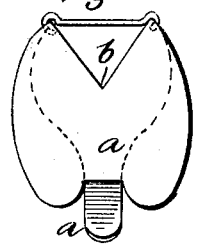
WITNESSES
C. C. Duffey
Amos W. Hart
INVENTOR
WALTER V. GILBERT
BY Munn & Co.
ATTORNEYS
THE NORRIS PETERS CO., WASHINGTON, D. C.

UNITED STATES PATENT OFFICE.

WALTER VILLA GILBERT, OF LONDON, ENGLAND.

COMPOUND SPRING-LEVER.

No. 833,042.   Specification of Letters Patent.   Patented Oct. 9, 1906.

Application filed May 9, 1906. Serial No. 316,047.

*To all whom it may concern:*

Be it known that I, WALTER VILLA GILBERT, a subject of the King of Great Britain, residing in the city of London, England, have invented a Compound Spring-Lever, of which the following is a specification.

The invention is an elastic or resilient device which is practically in the nature of a compound lever, and serves upon being actuated by one motion, as by being compressed in one direction or opposing directions from its normal condition, to impart or allow a plurality of motions in various directions and, in recovering its normal condition upon being released from said pressure or actuation, to impart or allow a corresponding plurality of motions reciprocal to those caused or allowed by said actuation.

The device is formed of a plate of spring or elastic material bent into a peculiar shape, the body or back portion thereof being indented, bowed, or depressed transversely (such indentation, however, not extending beyond the configuration of said back) and the side portions or wings projecting from said body or back portion opposite each other and constituting movable parts adapted to approach each other when pressure is applied to the ends of the depressed back or body portion. The said side portions or wings may thus be closed or brought into nearer relationship, and upon release of said pressure they will resume their normal relative positions. Hence they may serve as jaws or lever-arm extensions for closing on another object or article or for actuating or allowing actuation of other parts or mechanism, the device being thus available for various practical applications for industrial purposes.

The device may be made of steel, aluminium, cardboard, or other suitable flexible, elastic, or resilient material which is capable upon being compressed in one direction of tending to resume its normal condition.

The details of construction and operation are as hereinafter described, and illustrated in the accompanying drawings, in which—

Figure 1 is a plan view of the blank—to wit, the plate or sheet—from which the device is formed. Fig. 2 is a perspective view showing the form into which the plate is first bent in producing my device. Fig. 3 is a perspective view of the basic device complete, or in the form produced by the second and more important stage or step in construction. Fig. 4 is a cross-section on the line 4 4 of Fig. 3. Fig. 4$^a$ is a cross-section taken between the center and end of the device. Fig. 5 is a plan view of the device looking down upon its back or top, holes or openings being omitted. Fig. 6 is a side view of the same. Fig. 7 is a bottom or front view. Fig. 8 is a plan view, Fig. 9 a side view, and Fig. 10 a front or bottom view of the device, all showing the jaws or wings closed as when pressure is applied to the ends $c$ of the device. Figs. 11, 12, 13, and 14 are end views of the device, showing the jaws or wings opened more or less and also closed. Fig. 15 is a side view of the device with a tension-rod connecting its ends. Fig. 16 is an end view of device shown in Fig. 15 with the addition of a tension-rod connecting its jaws or wings. Fig. 17 is a perspective view. Fig. 18 is a central cross-section of the device, as shown in Fig. 17. Fig. 19 is a plan view further illustrating the device. Figs. 20 to 31, inclusive, are views illustrating the device in several practical applications, which will be hereinafter more particularly described.

The thin resilient sheet or plate from which the device is formed is, say, rectangular and oblong, as indicated in Fig. 1. The plate is first bent crosswise, so that it presents the curved shape shown in Fig. 2, and in the second and final stage the back is indented centrally and transversely at $b$, as shown in Figs. 3 and 4. The device has thus an indented bowed or arched back and opposite concave side portions $a$, which curve inward more or less.

It will be noted (see Fig. 4$^a$) that the back portion merges into and joins up with the sides or wings of the device by means of an arched and internally-concaved connection. The wings may converge, as in Figs. 5, 7, 8, 10, 11, or be parallel, as in Fig. 12, or diverge, as in Fig. 13. Fig. 14 shows the maximum convergence of the figure illustrated. As will be seen in Figs. 3, 5, 7, 8, 10, the back is widest at the point of deepest indentation $b$ and narrows gradually therefrom to the ends $c$. Thus on each side of the transverse line of indentation there is formed a relatively flat triangular portion with abutting bases, the apices extending into a bowed form. The whole back thus presents practically an indented diamond or square shape. The device is thus so constructed that when in operation longitudinal section of either wing must present an uninterrupted curved form.

A plan of an end portion of either wing must present a curved form, such curvature being most pronounced contiguous to the apices $c$ of the back and decreasing gradually toward the center until a cross-section of a wing taken centrally would approximate a straight line. These characteristics are accentuated as the device is brought into its maximum convergence by compression. Thus when pressure is applied at the bowed apices $c$ the form of the device will change from the assumed normal position shown in Figs. 5, 6, 7, 11 to the ones shown in Figs. 8, 9, 10, 14. In other words, the bowed apices $c$ will approach each other slightly, the indentation will recede lower, the said triangular back portions assume a more acute angular relation, and the jaws or wings approach each other. Upon release of such endwise compression the device resumes its original shape by its own resiliency and the wings $a$ move outward or away from each other. It is thus made apparent that the device operates as a compound spring-lever.

It is to be understood as a matter of no consequence, so far as the general operation is concerned, whether the side lines of the triangular components of the back converge so as to meet inside or at the end limits of the back, since the effect of compression is the same in both cases.

The operations of the device can be limited or controlled by any suitable means, such as a tie-rod or link $d$, Fig. 15, located between and connecting the apices $c$. This tie-rod is omitted in several other views. It has screw-threaded end portions, and spherical nuts are applied thereto and spaced apart, and thus serve to delimit the movement of the device. The wings $a$ may be similarly controlled, as shown in Fig. 16.

The terminal points of the indent $b$, where opposing strains meet and act upon each other in the operation of the device, are preferably perforated or provided with round holes $e$, Figs. 1, 2, 3, 17, 18, the effect of which is to increase the flexibility and resiliency of the device while tending to counteract any tendency of the same to crack along the sides and common bases of the back triangular components. Reinforces $f$ may be superposed at the edges of these said perforations $e$, thus tending to prevent the said indent extending longitudinally under undue strain.

The operating parts of the device may be connected or disposed in any suitable manner in relation to other parts or devices which require to be operated so as to impart motion thereto or allow motion thereof. Openings serving as passages for such connections or enabling tension to be distributed at an increased plurality of angles to the direction of the force exerted on the device at said apices may be made in the latter. For instance, as shown at Figs. 1, 2, 3, 19 and others, the indent $b$ may be perforated between its ends, so as to leave an opening $g$ between the bases of said triangular components, or the said triangular components may be perforated, as at $h$, in the same figure.

The device may be formed by pressing, bending, or otherwise shaping it from the flat or otherwise in any appropriate manner—say by dies.

An elastic or resilient device shaped as described can be applied with advantage for many industrial purposes where reciprocal motions in various directions are required.

Figs. 20, 21, 22 represent the device in side and end views, respectively, adapted as a letter-holder, shoulders being formed in the central portion of the indent $b$, the same being cut out, as at $i$, said shoulders being deviced to position and adjust the backs or upper edges of letters or papers, which are held detachably by a pin $k$, that passes through them. The apices $c$ are also connected by a link $l$, so as to cause the wings or side parts $a$ to hold the pin in position to support the papers.

Figs. 23, 24 represent the device adapted as a door-closer, it being hinged at one apex $c$ to the door-frame $m$ and engaging at the other apex $c$ the door $n$.

Fig. 25 represents the device adapted as a wheel-brake. In practice one apex $c$ will be secured to the vehicle-frame and the other apex to a brake-wire, whereby a braking action of the device may be caused in that the spring-jaws $a$ will converge upon the wheel-rim by the said apices being brought into nearer relation by pressure as aforesaid.

Figure 5:
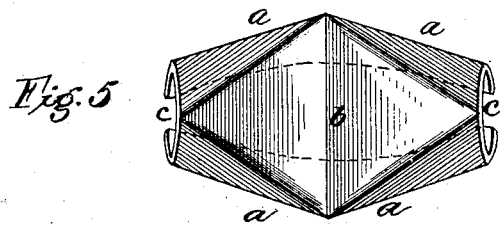
Figure 11:
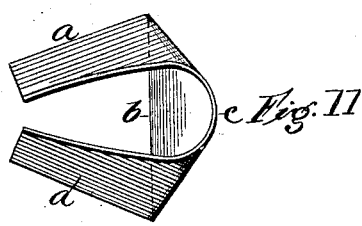
Figure 6:
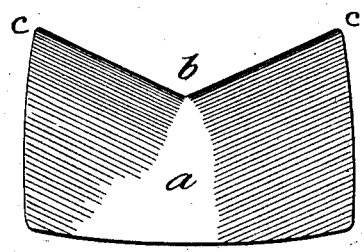
Figure 12:
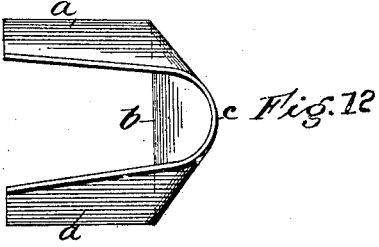
Figure 7:
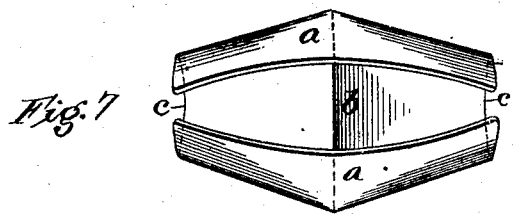
Figure 13:
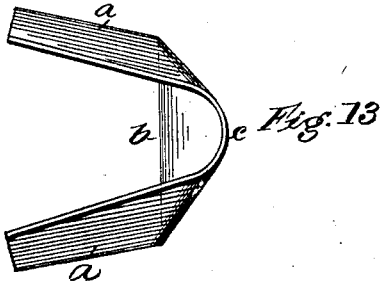
Figure 8:
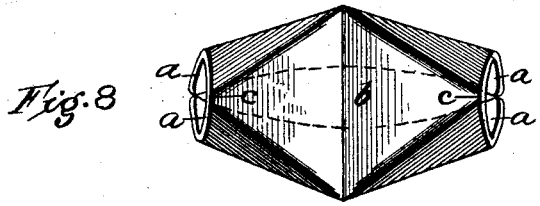
Figure 14:
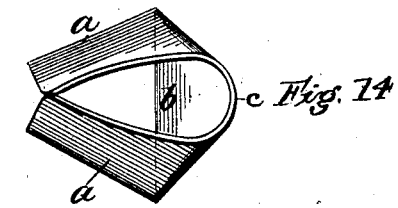
Figure 9:
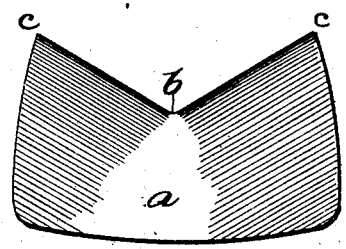
Figure 10:
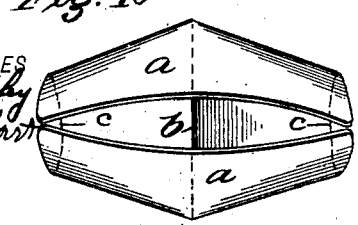

Figs. 26, 27, 28 represent the device adapted as sugar-tongs. The extended portions of the jaws are shown corrugated for strength. Figs. 29, 30, 31 show it as a clothes peg or fastener, one wing or jaw $a$ being longer than the other part $a$ and adapted to enter a recess in the such other part, so as to close about the clothes-line, and the indent being shouldered as aforesaid for better positioning the peg upon the line.

The foregoing are merely indications of a few of the practical uses to which my invention may be applied; but it is to be understood that I do not limit myself to the said examples, as my invention is applicable to a variety of purposes.

What I claim is—

1. The elastic device having sides or wings curved longitudinally and transversely, and a connecting-back formed of like triangular components, the lines of junction of said sides and back gradually merging from an angle into a curve, whereby maximum resiliency and durability are attained, as described.

2. The elastic device formed from a resilient plate, and comprising indented back having like flat portions and sides, or wings, which are curved inward transversely and longitudinally, the sides or wings having their ends tangentially extended from the end portions of back, as shown and described.

3. The elastic device formed from an elastic plate bent into bow shape and indented crosswise, the back forming a diamond-shape spring-lever whose side and end portions merge gradually into the concave sides or wings so that when pressure is applied to the extremities of such lever, the wings converge, and upon release of pressure the same diverge and resile to their original position, substantially as described.

4. The device formed from a blank of elastic or resilient material, the same having a bowed shape in one direction and the back of the bow being indented transversely and the opposing sides of the device being concave interiorly, substantially as described.

5. The elastic or resilient device formed from sheet metal or other suitable flexible material and having an indented bowed back of a diamond or square configuration and formed with side members or wings which close inwardly when pressure is applied at the apices of the bowed back and return by their own resiliency to their normal position when such pressure is relieved, for the purposes and substantially as hereinbefore set forth.

6. The device described formed from an oblong rectangular plate of elastic material, the plate having a central bend or bow shape and the back of the bow having a central transverse indent or depression and on opposite sides of such indent like flat triangles or triangular portions, the bases of the same abutting and their apices being limited by the ends of the device, the back constituting a bowed spring-lever, as described.

7. The device described formed from a plate of elastic material, the same having a bow shape and a transverse indent in the back with like flat triangular portions on opposite sides thereof, and provided with holes formed at the end limits of the indentation, as and for the purpose specified.

8. The device described formed from a plate of elastic material, the same having a bow shape and the back having a transverse indentation and holes formed at the ends of the indent and a reinforce applied at the edge of each of said holes, as shown and described.

9. The device described formed from a plate of elastic material the same having a central bend extending in one direction and an indent or downward bend in the opposite direction or transversely and provided with an opening formed in the indented portion and extending a portion of the length of the indent, as shown and described.

10. The device described formed from a plate of elastic material, the same having a central bend extending in one direction and an indent or downward bend in the opposite direction or transversely and provided with an opening formed in the bowed back and across the indent into the flat opposite triangular portions, as shown and described.

11. The device composed of an elastic plate and having a bow shape with a transverse indent and like flat triangular portions, extending in opposite directions from the indent, concave wings extending oppositely from the indented back and a device connecting the ends of said back and serving to delimit the movements of said ends due to alternate compression and release, as described.

WALTER VILLA GILBERT.

Witnesses:
   SOLON C. KEMON,
   PERRY B. TURPIN.